United States Patent

Hooper et al.

[11] Patent Number: 6,116,286
[45] Date of Patent: Sep. 12, 2000

[54] PNEUMATIC PIPE PLUG

[76] Inventors: Robert A. Hooper, 3313 Breconwood Cir., Wayzata, Minn. 55391; William D. Pearson, 14240 96th Ave. North, Maple Grove, Minn. 55369

[21] Appl. No.: 09/123,395

[22] Filed: Jul. 15, 1998

[51] Int. Cl.[7] ..................................................... F16L 55/12
[52] U.S. Cl. ................................ 138/93; 138/94; 138/90; 73/49.8
[58] Field of Search .................................. 138/93, 90, 94, 138/89; 73/49.8; 4/255.01, 256.1; 285/144, 147, 148

[56] References Cited

U.S. PATENT DOCUMENTS

| | | | |
|---|---|---|---|
| 3,129,726 | 4/1964 | Moore | 138/93 X |
| 4,080,799 | 3/1978 | Nanny | 138/93 X |
| 4,122,869 | 10/1978 | Roberson, Sr. | 138/93 |
| 4,203,473 | 5/1980 | Roberson, Sr. | 138/93 |
| 4,658,861 | 4/1987 | Roberson, Sr. | 138/93 X |
| 5,353,841 | 10/1994 | Mathinson et al. | 138/93 |
| 5,370,147 | 12/1994 | Brusse et al. | 138/93 X |
| 5,413,136 | 5/1995 | Prescott | 138/93 X |
| 5,771,937 | 6/1998 | Collins | 138/93 |

Primary Examiner—Patrick F. Brinson

[57] ABSTRACT

A pneumatic pipe plug for pipeline tee-connections and access ports having a molded cap structure, an elastomeric inflatable body, and a sealant ring. The molded cap structure of the pneumatic pipe plug having two concentrically spaced projections which act to receive and seal the elastomeric inflatable body. The elastomeric inflatable body having a closed bottom and an open top which has a peripheral shoulder extending therefrom. The sealant ring of the pneumatic pipe plug having a threaded exterior and an interior lip which compresses the peripheral ridge of elastomeric inflatable body against the projections of the molded cap structure when the sealant ring is joined to the molded cap structure. The molded cap having an inflation device that is suitable to regulate air flow through the upper surface of the cap and into the area contained within the inner most projection of the lower molded cap.

4 Claims, 2 Drawing Sheets

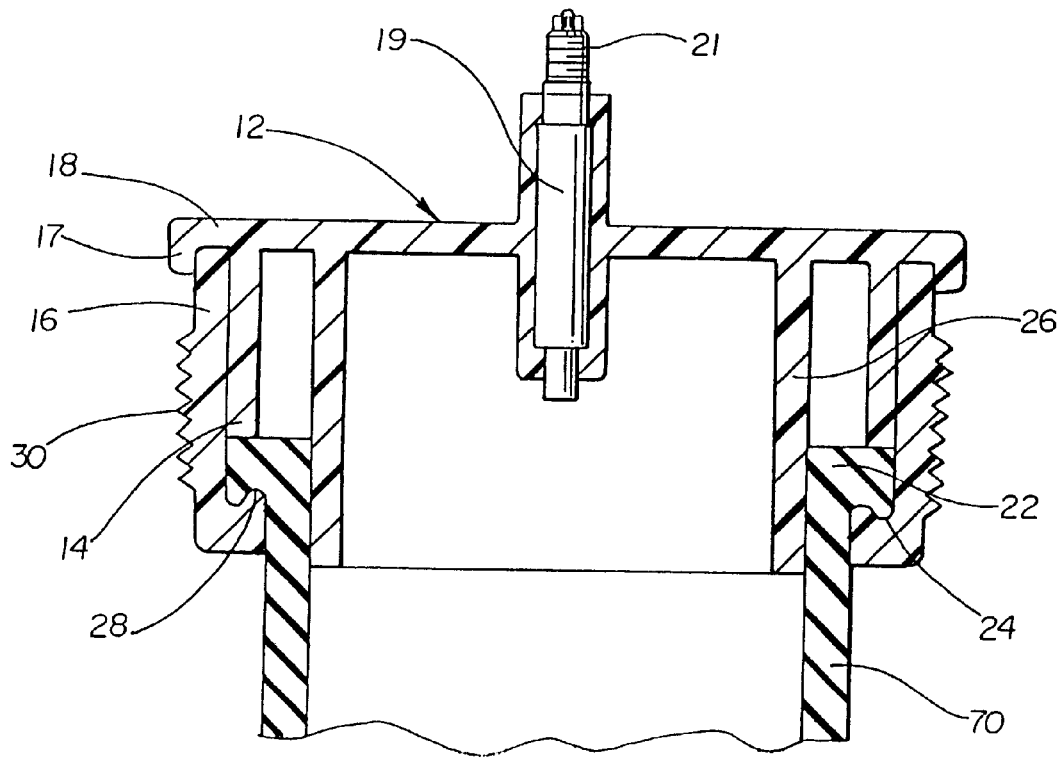
*Fig. 2*
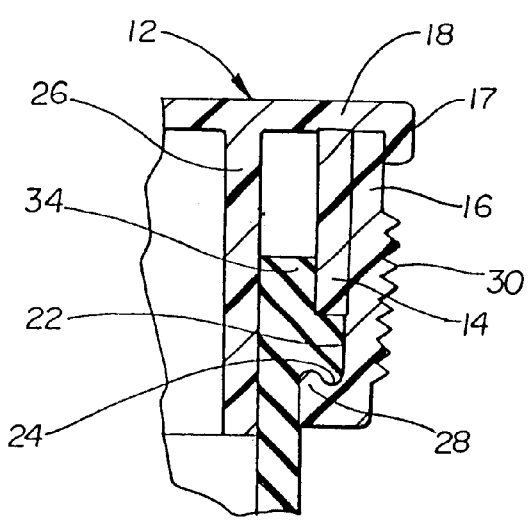
*Fig. 3*
*Fig. 4*

PNEUMATIC PIPE PLUG

BACKGROUND OF THE INVENTION

1. Field of the Invention

This invention relates to pneumatic plug devices for sealing pipelines or conduits. Particularly, this invention relates to pneumatic test plugs for sealing or restricting flow at access ports and tee-connections of low pressure pipelines or conduits.

2. Description of the Related Art

Low pressure pipelines and conduits are common plumbing elements of virtually all residential and many commercial structures. These types of pipes often contain access ports and tee-connections which are normally utilized for cleaning and inspecting purposes. The tee-connections are normally circular in shape and are often internally threaded to receive a threaded closure cap.

The pneumatic pipe plug device of this invention permits a user to utilize an access port or tee-connection and to seal the pipeline or restrict the flow of fluid passing through. Such a utilization allows the user to test the pipe for leakage, vary flow rates, or for similar purposes.

Numerous plugs for sealing tee-connections have been previously proposed. Most of these devices have typically been complex structures which have been difficult or expensive to manufacture. For example, U.S. Pat. No. 4,658,861 to Roberson (hereinafter "the '861 patent") discloses a test plug assembly for pressure testing fluid drains and vent systems. Utilizing an inflatable body and a rigid holder portion which are united by a valve stem, the '861 patent construction is difficult and expensive to manufacture. Furthermore, uniting the inflatable body and the rigid holder portion require a relatively harder elastomeric material which may compromise proper sealing of the plug assembly in some conduit structures.

In an effort to overcome the difficulties associated with the '861 invention U.S. Pat. No. 5,353,841 to Mathison et al. (hereinafter "the '841 patent") disclosed a pneumatic plug for clean-out tees which uses a retention collar to secure the elastomeric body to the rigid end cap. While the '841 invention did address some of the shortcomings of the '861 patent, the '841 patent still required a complex construction and procedure in order to join the retention collar to the end cap.

The pneumatic pipe plug according to the teachings of this invention overcome the difficulties, limitations and other shortcomings of these prior art devices.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

SUMMARY OF THE INVENTION

The invention provides for a pneumatic pipe plug for pipeline tee-connections and access ports. The pneumatic pipe plug has a molded cap structure having an upper and lower surface. The lower surface has two concentrically spaced projections which extend away from the lower surface, the inner most projection extends further away than the outer most projection. These projections are surrounded by a peripheral border of like molded material. The molded cap contains an inflation device that is suitable to regulate air flow through the upper surface of the cap and into the area contained within the inner most projection of the lower molded cap.

An elastomeric semi-rigid inflatable body is provided with a closed bottom end and an open top end. The open top end of the inflatable body has a peripheral shoulder extending therefrom. The peripheral shoulder further has a downwardly extending peripheral ridge. The opening in the top of the inflatable body is intended to receive the innermost projection of the molded cap, while the peripheral shoulder of the inflatable body should contact the outermost projection when the inflatable body and the molded cap are brought together.

The pneumatic pipe plug further provides for a sealant ring having both inside and outside surfaces. The inside surface having a single lip which acts to prevent the complete passage of the inflatable body when it is drawn into the ring by imposing the sealant ring lip against the peripheral shoulder of the inflatable body. The inflatable body is received into the sealant ring, where upon the sealant ring is drawn upward along the length of the inflatable body until the peripheral ridge of the inflatable body is compressed by the lip of the sealant ring's inner surface. The joining of the inflatable body and the sealant ring will allow the sealant ring to be positioned to contact the peripheral border of the molded cap structure. The sealant ring and the molded cap are held together at their mutual contact surface by a suitable cement, glue or other bonding agent. The outer surface of the sealant ring has exteriorly disposed threads which allow the user to readily insert the pneumatic pipe plug into a internally threaded access port or tee-connection.

BRIEF DESCRIPTION OF THE DRAWINGS

A detailed description of the invention is hereafter described with specific reference being made to the drawings in which:

FIG. 2 is a lateral cross-sectional view of the pneumatic pipe plug of this invention;

FIG. 3 is a lateral cross-sectional detail of an alternative embodiment of the peripheral shoulder and peripheral ridge of the elastomeric semi-rigid inflatable body; and FIG. 4 is a lateral cross-sectional detail of a second alternative embodiment of the peripheral shoulder and peripheral ridge of the elastomeric semi-rigid inflatable body.

DESCRIPTION OF THE PREFERRED EMBODIMENTS

Figure 1:
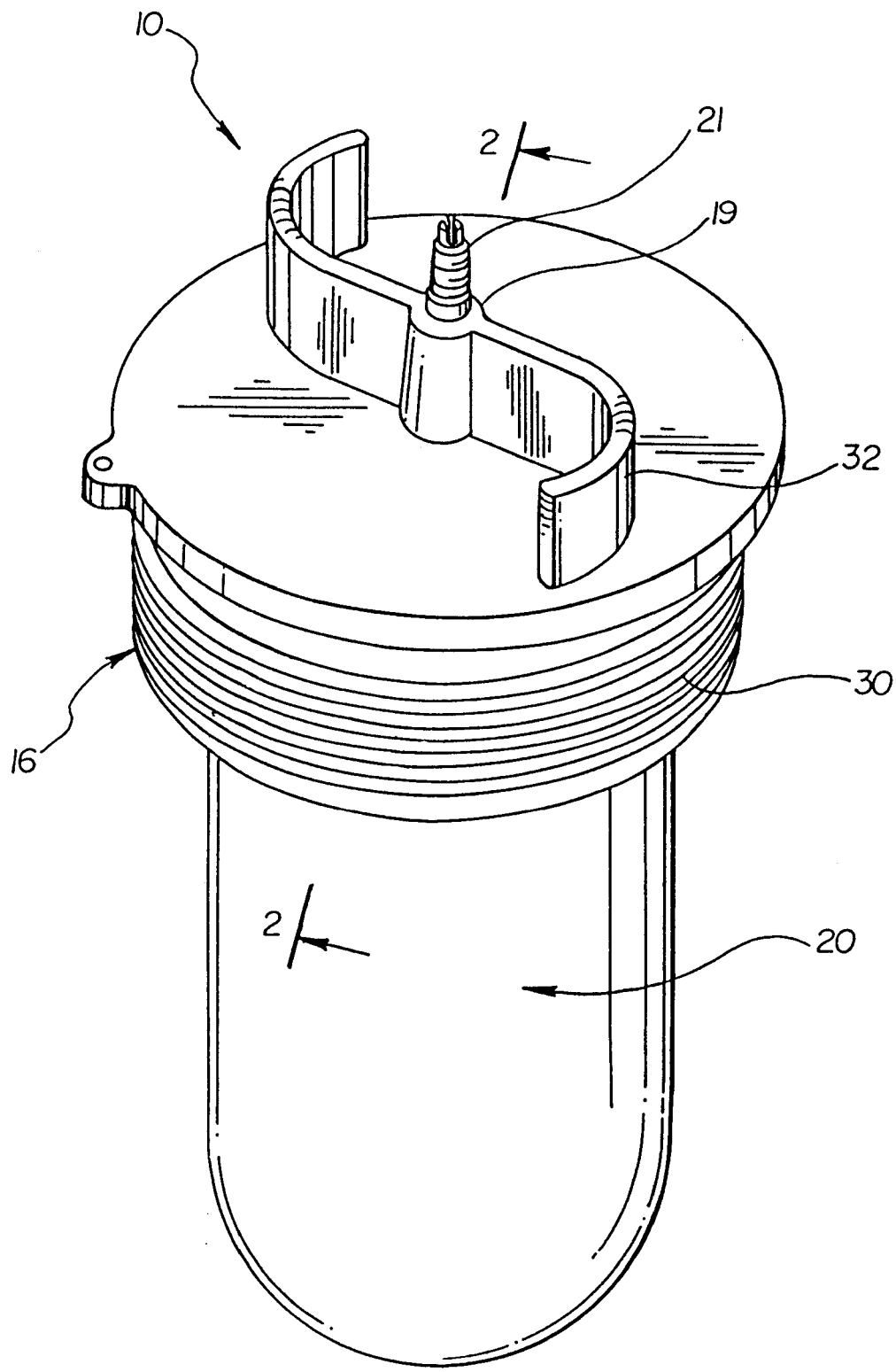
FIG. 1 is an overhead schematic view showing the pneumatic pipe plug with all three components joined in their assembled form.

The following detailed description and the accompanying drawings are provided for purposes of describing and illustrating presently preferred embodiments or examples of specific embodiments of the invention only. This description and accompanying drawings are not intended to limit the scope of the invention in any way.

Referring to FIG. 1 of the accompanying drawings a pneumatic pipe plug 10 is shown in a fully assembled state. When fully assembled the sealant ring 16 is held to the molded cap structure 12 by an appropriate cement, glue, or bonding agent. The elastomeric semi-rigid inflatable body 20 is held in position and compressed between the sealant ring 16 and the molded cap structure 12. When fully assembled the user of the pneumatic pipe plug 10 may insert the pneumatic pipe plug 10 into an internally threaded pipe access port or tee-connection by manipulating the graspable projection 32 and thereby inserting the pneumatic pipe plug 10 into the tee-connection or access port. The pneumatic pipe plug 10 will readily be received by most pipe access ports or tee-connections due to the presence of externally threaded surface 30 which are a surface feature of sealant ring 16. The externally threaded surface 30 of the sealant ring 16 is designed to threadingly accept and be accepted by opposing threaded surfaces such as the inside surface of a tee-connection or access port. The pneumatic pipe plug 10 can be secured into the tee-connection or access port by applying rotational torque to the graspable projection 32.

Referring to FIGS. 2–4, the pneumatic pipe plug 10 shown in the accompanying drawings generally comprises a molded cap structure 12, an elastomeric semi-rigid inflatable body 20, and a molded sealant ring 16.

In the preferred embodiment the molded cap structure 12 will have two downwardly oriented concentric projections. The inner projection 26 will define the diameter of the elastomeric semi-rigid inflatable body 20. When the pneumatic pipe plug is assembled the inner projection 26 will receive the elastomeric semi-rigid inflatable body 20 and act to both support and seal the elastomeric semi-rigid inflatable body 20 to the molded cap structure 12.

The depth to which the inner projection 26 extends into the elastomeric semi-rigid inflatable body 20 is limited by the length of the inner projection 26, and also the length of the outer projection 14. The outer projection 14 of the molded cap structure 12 is constructed to contact and compress the peripheral shoulder 22 and peripheral ridge 24 of the elastomeric semi-rigid inflatable body 20 when the pneumatic pipe plug 10 is fully assembled. This inventive design results in an air tight seal between the molded cap structure 12 and the elastomeric semi-rigid inflatable body 20.

The molded cap structure 12 has the additional design feature of a centrally mounted air flow regulator 19. In the preferred embodiment the regulator has a threaded valve stem 21 which will receive a wide variety of air inflation devices thus allowing a greater ease of use. The air flow regulator 19 is positioned to allow air to pass from the outside of the pneumatic pipe plug 10 to the inside of the molded cap structure 12, more specifically the area defined by the inner projection 26 and the inside area of the elastomeric semi-rigid inflatable body 20. As a result of this positioning, the air flow regulator 19 allows inflation and deflation of the elastomeric semi-rigid inflatable body 20.

A further design feature of the molded cap structure 12 is the presence of a peripheral border 18. The peripheral border 18 has a sufficient area to allow a layer of cement, glue, or other bonding agent to be applied between the sealant ring 16 and the peripheral border 18 thereby securing the sealant ring 16 to the peripheral border 18 when the pneumatic pipe plug is fully assembled. In the preferred embodiment of the invention the peripheral border 18 also has the added feature of a downward projecting rim or flange 17. Such a design feature provides additional surface area for bonding agent to secure the sealant ring 16 and the molded cap structure 18.

A key inventive feature of the present invention is the ability to utilize a number of different styles of elastomeric semi-rigid inflatable bodies. While most elastomeric semi-rigid inflatable bodies have a similar elongated domed shape, they often vary in regard to their respective peripheral shoulders. FIGS. 2–4 show three possible peripheral shoulder embodiments which may be utilized in the present invention. The preferred embodiment as shown in FIG. 2 shows an elastomeric semi-rigid inflatable body 20 which has a peripheral shoulder 22. Extending downward from the peripheral shoulder 22 is a peripheral ridge 24. The peripheral ridge 24 rests on the inside lip 28 of the sealant ring 16. When the sealant ring 16 is bonded to the molded cap structure 12 the peripheral ridge 24 is compressed between the outer projection 14 of the molded cap structure 12 and the inside lip 28 of the sealant ring 16. As a result the elastomeric semi-rigid inflatable body 20 is completely sealed to the molded cap structure and the pneumatic pipe plug 12 is fully assembled.

The alternative embodiment illustrated in FIG. 3 shows a peripheral shoulder 22 with an additional extension 34 of the elastomeric semi-rigid inflatable body 20. Such an extension is intended to further assist in establishing an air tight seal between the inside area of the elastomeric semi-rigid inflatable body 20 and the molded cap structure.

The further alternative embodiment illustrated in FIG. 4 shows an alternative peripheral shoulder 36 which has a larger height and width than the preferred embodiment shown in FIG. 1. Such a peripheral shoulder would warrant the use of an alternate embodiment of the molded cap structure 12 having a shorter outer projection 38.

In addition to the alternative forms of elastomeric semi-rigid inflatable bodies described above and illustrated in FIGS. 3–4 there exists several types of elastomeric semi-rigid inflatable bodies which can be utilized in place of the described preferred or alternative embodiments included herein.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. A pneumatic pipe plug comprising:
   (a) a molded cap structure having an upper and lower surface, the lower surface having two concentrically spaced projections which extend away from the lower surface, said projections including an inner most projection extending downwardly further than an outer most projection from said lower surface, said projections being further surrounded by a peripheral border, said cap having an inflation device suitable to allow air to pass through the upper surface of the cap and into the area contained within the inner most projection;
   (b) an elastomeric, semi-rigid inflatable body having a closed bottom end, and an open top end having a peripheral shoulder extending therefrom, said peripheral shoulder further having a downwardly extending peripheral ridge, the opening of said top end being of sufficient diameter to receive said inner most projection of said molded cap, said outer most projection being of sufficient diameter to contact said peripheral shoulder of said molded cap; and (c) a sealant ring having inside and outside surfaces, said inside surface having a lip which compresses said inflatable body's downwardly extending peripheral ridge, said outer surface having exteriorly disposed threads, said sealant ring being of sufficient diameter to contact said molded cap's lower surface peripheral boarder.

2. The pneumatic pipe plug of claim 1 wherein said molded cap has an externally threaded valve stem which passes through the molded cap structure and extends from the upper surface of said cap.

3. The pneumatic pipe plug of claim 1 wherein said upper surface of the molded cap structure has a graspable projection extending therefrom to allow rotation of the pipe plug by a human hand.

4. The pneumatic pipe plug of claim 1 wherein said sealant ring and said peripheral border of the molded cap structure are secured together by means of a solvent cement.

* * * * *